US007347937B1

(12) United States Patent
Cheng et al.

(10) Patent No.: US 7,347,937 B1
(45) Date of Patent: *Mar. 25, 2008

(54) PERFLUORINATED THERMOPLASTIC FILTER CARTRIDGE

(75) Inventors: Kwok-Shun Cheng, Nashua, NH (US); Cha P. Doh, Sudbury, MA (US); Larry Y. Yen, Andover, MA (US); Rajnikant B. Patel, Tewksbury, MA (US); T. Dean Gates, Bedford, MA (US)

(73) Assignee: Entegris, Inc., Chaska, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/890,290

(22) PCT Filed: Jan. 28, 2000

(86) PCT No.: PCT/US00/02423

§ 371 (c)(1),
(2), (4) Date: Jul. 27, 2001

(87) PCT Pub. No.: WO00/44485

PCT Pub. Date: Aug. 3, 2000

(51) Int. Cl.
*B01D 63/06* (2006.01)
*B01D 63/00* (2006.01)

(52) U.S. Cl. .......................... 210/497.1; 210/321.78; 210/323.2; 210/342; 210/321.87; 210/497.01

(58) Field of Classification Search ............ 210/321.6, 210/321.61, 450, 321.74–321.8, 500.36, 210/500.23, 321.84–321.89, 500.27, 321, 210/78; 264/41, 129; 95/54; 96/8, 10; 156/69, 156/187, 192, 244.12
See application file for complete search history.

(56) References Cited

U.S. PATENT DOCUMENTS

| 4,902,456 A | 2/1990 | Yen et al. |
| 4,906,377 A | 3/1990 | Yen et al. |
| 4,990,294 A | 2/1991 | Yen et al. |

(Continued)

FOREIGN PATENT DOCUMENTS

DE 34 44 387 7/1985

(Continued)

OTHER PUBLICATIONS

Derwent Publication XP-002142276 Abstract of JP 04 354521, (2004).

*Primary Examiner*—Krishnan S Menon
(74) *Attorney, Agent, or Firm*—Ernest V. Linek; Timothy J. King

(57) ABSTRACT

A filtration cartridge having a housing with an inlet and an outlet and a filtration membrane contained within the housing and located between the inlet and the outlet is described. The membrane is sealed in such a manner that all fluid must flow through the membrane between entering the inlet and leaving the outlet of the housing. The entire cartridge, housing, membrane and any other components are all formed of one or more perfluorinated thermoplastic resins. These resins preferably are PFA, MFA, FEP and blends thereof. The membrane may be in the form of hollow fibers, wound fibers such as in a depth filter, or a flat sheet which may be formed into various configurations such as spiral filters, pleated filters, spiral pleated filters, disks and the like. These cartridges provide an inert, high temperature and acid/oxidative chemical resistant filter having properties similar to that of PTFE resins.

14 Claims, 5 Drawing Sheets

U.S. PATENT DOCUMENTS

| | | | |
|---|---|---|---|
| 5,032,274 A | | 7/1991 | Yen et al. |
| 5,066,397 A | * | 11/1991 | Muto et al. ............ 210/321.61 |
| 5,154,827 A | | 10/1992 | Ashelin et al. |
| 5,158,680 A | | 10/1992 | Kawai et al. |
| 5,290,446 A | * | 3/1994 | Degen et al. ................ 210/489 |
| 5,490,931 A | | 2/1996 | Chung et al. |
| 5,695,702 A | | 12/1997 | Niermeyer |
| 5,762,789 A | | 6/1998 | Reyes et al. |
| 5,855,783 A | | 1/1999 | Shucosky et al. |
| 6,582,496 B1 | * | 6/2003 | Cheng et al. .................. 95/46 |
| 6,663,745 B1 | * | 12/2003 | Cheng et al. ................ 156/293 |

FOREIGN PATENT DOCUMENTS

| | | |
|---|---|---|
| EP | 0 175 432 | 3/1986 |
| EP | 0 217 482 | 4/1987 |
| EP | 0 299 459 | 1/1989 |
| EP | 0 340 732 | 11/1989 |
| EP | 0 343 247 | 11/1989 |
| EP | 0 559 149 | 9/1993 |
| EP | 0 803 281 | 10/1997 |
| EP | 0 855 212 | 7/1998 |
| FR | 2 566 003 | 12/1985 |
| WO | WO 00/44479 | 8/2000 |
| WO | WO 00/44480 | 8/2000 |
| WO | WO 00/44482 | 8/2000 |
| WO | WO 00/44483 | 8/2000 |
| WO | WO 00/44484 | 8/2000 |
| WO | WO 00/44485 | 8/2000 |

* cited by examiner

PERFLUORINATED THERMOPLASTIC FILTER CARTRIDGE

This application is the Section 371(c) filing of copending PCT Application No. PCT/US00/02423, filed 28 Jan. 2000, which designated the United States and was published in the English language as WO 00/44485 on 3 Aug. 2000. The PCT Application claimed priority from U.S. Provisional Application Ser. No. 60/117,762, filed 29 Jan. 1999.

This invention relates to a filter cartridge that is formed of one or more perfluorinated thermoplastic resins. Moreover, this invention relates to a filter cartridge that is formed of one or more perfluorinated thermoplastic resins, wherein the filter element is a flat sheet membrane which may be configured in various ways or a plurality of hollow fiber membranes or a depth filter.

BACKGROUND OF THE INVENTION

Filtration cartridges are well known devices used in many applications to separate substances such as particles, microorganisms, dissolved species, etc. from their carrier fluid. These cartridges are formed of one or more filtration membranes, either in the form of a flat sheet or in the form of hollow fibers, which are secured within a housing. Cartridges are configured so that the fluid to be filtered enters through an inlet, passes through the membrane filter, and the filtered fluid exits through an outlet. In some configurations, a portion of the entering fluid is removed through a second outlet as a concentrated stream. The membrane(s) provide a semi-permeable barrier that separates the inlet from the outlet so as to achieve filtration.

Filter cartridges are comprised of a membrane filter, a housing in which the filter is located and fluid-tight seals. Membrane filters are porous structures having average pore sizes of from about 0.005 micron to about 10 micron. Membranes with average pore size of from about 0.002 to about 0.05 micron are generally classified as ultrafiltration membranes. Ultrafiltration membranes are used to separate proteins and other macromolecules from aqueous solutions. Ultrafiltration membranes are usually rated in terms of the size of the solute they will retain. Typically, ultrafiltration membranes can be produced to retain dissolved or dispersed solutes of from about 1000 Daltons to about 1,000,000 Daltons. They can be rated by Molecular Weight Cutoff, which is the molecular weight expressed in Daltons, a unit of molecular mass, at which a stated percent of the feed concentration of the solute being processed is retained or rejected by the membrane. Manufacturers usually set the stated percent at 90% to 95%. Membranes with pore sizes of from about 0.05 to 10 microns are generally classified as microporous membranes. Microporous membranes are used in a wide variety of applications. Used as separating filters, they remove particles and bacteria from diverse solutions such as buffers and therapeutic containing solutions in the pharmaceutical industry, ultrapure aqueous and organic solvent solutions in microelectronics wafer making processes, and for pre-treatment of water purification processes Microporous membranes have a continuous porous structure that extends throughout the membrane. Workers in the field consider the range of pore widths to be from approximately 0.05 micron to approximately 10.0 microns. Such membranes can be in the form of sheets, tubes, or hollow fibers. Hollow fibers have the advantages of being able to be incorporated into separating devices at high packing densities. Packing density relates to the amount of useful filtering surface per volume of the device. Also, they may be operated with the feed contacting the inside or the outside surface, depending on which is more advantageous in the particular application.

Flat sheet membranes are typically pleated to increase the amount of membrane that can be packed into a cartridge. In commercial filter cartridges, a layer of a mesh or fabric or similar porous sheet is placed on either side of the membrane to act as a support and to provide drainage in the final cartridge. This sandwich arrangement is then pleated together. Typically, the multi-layered pleated sheet is made into a tight cylinder with the sheet ends together and with the pleats arranged axially. The sheet ends are sealed together by heat fusion or other means. Thermal fusion sealing of thermoplastic sheets such as polyethylene or polypropylene can be done directly, with no added materials. For non-thermoplastic sheets, such as PTFE, added bonding materials must be used. The pleated cylinder is placed in a cartridge housing, sometimes with a core in its inner diameter for support.

A hollow fiber porous membrane is a tubular filament comprising an outer diameter, an inner diameter, with a porous wall thickness between them. The inner diameter defines the hollow portion of the fiber and is used to carry fluid, either the feed stream to be filtered through the porous wall, or the permeate if the filtering is done from the outer surface. The inner hollow portion is sometimes called the lumen.

The outer or inner surface of a hollow fiber microporous membrane can be skinned or unskinned. A skin is a thin dense surface layer integral with the substructure of the membrane. In skinned membranes, the major portion of resistance to flow through the membrane resides in the thin skin. In microporous membranes, the surface skin contains pores leading to the continuous porous structure of the substructure. For skinned microporous membranes, the pores represent a minor fraction of the surface area. An unskinned membrane will be porous over the major portion of the surface. The porosity may be comprised of single pores or areas of porosity. Porosity here refers to surface porosity, which is defined as the ratio of surface area comprised of the pore openings to the total frontal surface area of the membrane. Microporous membranes may be classified as symmetric or asymmetric, referring to the uniformity of the pore size across the thickness of the membrane. In the case of a hollow fiber, this is the porous wall of the fiber. Symmetric membranes have essentially uniform pore size across the membrane cross-section. Asymmetric membranes have a structure in which the pore size is a function of location through the cross-section. Another manner of defining asymmetry is the ratio of pore sizes on one surface to those on the opposite surface.

The housing is usually a hollow cylinder, although other shapes are known. For ease of discussion, and not to be a limitation, cylindrical filters are discussed, although practitioners will be able to use the teachings and descriptions for other shapes. The membrane filter is located or placed within the housing. The housing serves to protect the membrane, to act as a pressure container in some cases, and to provide inlet and outlet ports or other connections for fluid flow to enter, exit, and contact the membrane filter in a controlled way.

In a practical filtration, the inlet stream is isolated from the filtered outlet stream. The filter cartridge membrane is formed and placed in the cartridge so that only one surface of the membrane contacts the inlet fluid, and the other membrane surface only contacts the filtered fluid that has passed through the membrane filter. This requires a seal to prevent the inlet fluid stream from bypassing the membrane to the outlet stream. The seal also can have provisions to allow the fluid passing through the membrane to exit the cartridge, or to serve as an inlet for fluid to be filtered to contact the membrane.

Fabricating a useful seal presents difficult problems. The seal material has to be chemically and thermally stable for the application in which the cartridge will see duty. For applications where perfluorinated membrane filters are beneficial, a sealing material of lesser properties would prevent full utility of the cartridge. The sealing material must bond well to the membrane filter, otherwise leakage can occur through the membrane-seal interface. In many cartridge designs, the seal and the cartridge housing must be bonded together liquid-tightly for the same reasons. Thermal bonding is a preferred method since it provides bonding on a molecular level, and does not require additional materials.

For hollow fiber membrane cartridges, fiber is cut or otherwise made to a specific length and a number of fibers gathered into a bundle. A portion of one or both ends of the fiber bundle are encapsulated in a material which fills the interstitial volume between fibers and forms a tube sheet. This process is sometimes called potting the fibers and the material used to pot the fibers is called the potting material. The tube sheet acts as a seal in conjunction with a filtration device. If the encapsulation process closes and seals the fiber ends, one or both ends of the potted fiber bundle are cut across the diameter or otherwise opened. In some cases, the open fiber ends are closed and sealed before encapsulation to prevent the encapsulation material from entering the open ends. If only one end is to be opened to permit fluid flow, the other end is left closed or is sealed. The filtration device supports the potted fiber bundle and provides a volume for the fluid to be filtered and its concentrate, separate from the permeating fluid. In use, a fluid stream contacts one surface and separation occurs at the surface or in the depth of the fiber wall. If the fiber outer surface is contacted, the permeating fluid and species pass through the fiber wall and are collected in the lumen and directed to the opened end or ends of the fiber. If the fiber inner surface is contacted, the fluid stream to be filtered is fed into the open end or ends and the permeating fluid and species pass through the fiber wall and are collected from the outer surface.

The pot is thermally bonded to the housing vessel in the present invention to produce a unitary end structure. The unitary end structure comprises the portion of the fiber bundle that is encompassed in a potted end, the pot and the end portion of the perfluorinated thermoplastic housing, the inner surface of which is congruent with the pot and bonded to it. By forming a unitary structure, a more robust cartridge is produced, less likely to leak or otherwise fail at the interface of the pot and the housing. The potting and bonding process is an adaptation of the method described in U.S. patent application 60/117,853, filed Jan. 29, 1999, the disclosure of which is incorporated by reference.

The cylindrical pleated filter is sealed in an analogous way. A portion of an end of the membrane and any support layers is placed in a form containing molten resin that surrounds and fills the interstitial spaces between and among the membrane and support layers. The resin containing the filter end is cooled and trimmed as needed. Several methods are availably known to those skilled in the art.

These cartridges are desirable in that they are easy to install and remove, provide protection to the membrane during installation, use and storage and make for a disposable item.

Manufacturers fabricate filter cartridges from various polymeric materials. Commonly, cartridges are made of polyolefins, polysulfone polymers, polyamides and other such well-known materials.

In the area of microelectronics, such as in the fabrication of semiconductors, such common polymeric materials cannot be used, as the conditions of production, namely highly acidic and oxidative chemicals or solvents used at high temperatures tend to dissolve or weaken most common polymeric materials. For this reason, fluorinated polymers, in particular poly(tetrafluoroethylene) (PTFE), being more chemically and thermally stable, are used. PTFE materials are the preferred materials of choice in that they are inert, capable of withstanding high temperatures and tend to have extremely low levels of extractables. However, the problems with manufacturing PTFE based cartridges are legendary. Not being thermoplastic, extreme processing parameters are required to fabricate PTFE into complex molded shapes. Additionally, PTFE materials do not tend to bond easily to any other materials including themselves.

Fluoropolymers can be placed into two general classes; those made from perfluorocarbon monomers and those made from monomers with hydrogen, chlorine, or both, and sufficient fluorine to contribute significantly to the resulting polymer properties. Perfluorinated polymers include poly(tetrafluoroethylene) (PTFE), poly(tetrafluoroethylene-co-hexafluoropropylene) (FEP), and poly(tetrafluoroethylene-co-perfluoro(alkylvinyl ether)) (PFA). The second class includes poly(ethylene-co-tetrafluoroethylene) (ETFE), poly(chlorotrifluoroethylene) (CTFE), poly(chlorotrifluoroethylene-co-ethylene) (ECTFE). Polyvinylidene fluoride (PVDF) and polyvinyl fluoride (PVF) are sometimes included in the second class.

PTFE does not flow and cannot be fabricated by conventional techniques that require manipulating molten polymer. Fabricators have developed innovative processing technologies, similar to modified powder metallurgy methods, in order to utilize this polymer. FEP and PFA polymers were developed to meet the need for perfluorinated polymers that had chemical and thermal stability close to PTFE, but had the advantages of being melt processable. Plastic fabricators are able to produce a wide variety of products, such as films, extruded tubing, valves, and intricate molded parts with PFA and FEP by high-speed extrusion, injection molding and blow molding methods. PFA also has better creep resistance than PTFE, which is important for products under constant compressive or tensile load.

Polymers of the second class do not have the chemical or thermal stability of FEP and particularly of PFA types. ETFE has an upper use temperature of about 150° C. and is affected by strong oxidizing acids, organic bases and sulfonic acid at elevated temperatures. PCTFE is swollen at room temperature by some ethers and esters, halogenated solvents and toluene. PECTFE has an upper use temperature of about 163° C.-177° C., and is affected by hot amines. FEP has an upper use temperature of about 200° C. and PFA, about 260° C. Both are less affected by chemicals than the members of the second class described.

Various attempts to make chemically resistant filter cartridges have been made under the terminology of "all fluorocarbon resins," "all fluoropolymer," or similar terminology. These filter cartridges rely on PTFE membranes and do not teach an all perfluorinated thermoplastic cartridge.

U.S. Pat. No. 4,588,464 relates to a method for producing a filter element made wholly of a fluorocarbon resin characterized by forming sheet comprising a filter membrane made of a fluorocarbon resin superimposed on both surfaces thereof into a pleated form, bending the pleated sheet into a cylindrical form liquid-tightly welding the edge parts of the adjacent both parts of the adjacent both sides, pre-welding the pleats by heating both end parts of the cylindrical pleat-form to a temperature higher than the melting point of the net supporter, cooling the pre-welded filter, melting a thermoplastic fluorocarbon resin in a circular mold having means defining a central opening, inserting the end parts of the cooled pre-welded pleat into the molten thermoplastic fluorocarbon resin in the circular mold having a central opening to force the resin into the pleats, whereby the end part and the resin are integrally welded together, and fitting fluorocarbon caps having a prescribed shape in the end parts of the resulting filter material. This patent does not differentiate between perfluorinated thermoplastic polymers and other fluorocarbons having inferior chemical and thermal stability. Moreover, the patent is directed to the use of PTFE membranes, as the "welding the edge parts of the adjacent both parts of the adjacent both sides" requires a separate thermoplastic tape, as the PTFE membrane cannot be thermally sealed to itself, as could thermoplastic membranes.

U.S. Pat. No. 5,114,508 relates to the same invention of U.S. Pat. No. 4,588,464, without the pre-welding of the web supports to the membrane described above. As in U.S. Pat. No. 4,588,464, this patent does not differentiate between the advantages of perfluorinated thermoplastic polymers and other fluorocarbons having inferior chemical and thermal stability. The edge parts are welded with a separate tape, which would not be required for a thermoplastic membrane. No description of perfluorinated thermoplastic membranes is given.

U.S. Pat. No. 4,154,688 suggests fusing a pleated membrane cylinder to an end cap of PTFE, but states that this would be difficult, and given that PTFE is not fluid even above its melting point, PTFE would not serve as a suitable bonding agent.

U.S. Pat. No. 4,609,465 provides a filtering apparatus for removing particulates from destructive fluids. In accordance with the invention, all components of the filtering apparatus are fabricated from a fluoropolymer. These are defined as any fluorine-containing polymer, including perfluoropolymers, which are highly resistant to the deteriorative effects of destructive fluids, such as acids and/or solvents. No advantages are taught that would enable a practitioner to choose between perfluorinated thermoplastics and other fluoropolymers, such as PVDF, a preferred embodiment of the invention. PVDF is known to be soluble in aprotic solvents such as dimethylacetamide, and swollen by other solvents, such as some esters, and is therefore not suitable for uses in many applications requiring solvent resistance. Moreover, the invention of U.S. Pat. No. 4,609,465 requires a sealing ring cooperatively arranged with an end cap, with at least the surface of the sealing ring comprising a fluoropolymeric material. Such an arrangement will not provide as integral a seal under severe conditions as a thermally bonded seal.

U.S. Pat. Nos. 5,066,397 and 4,980,060 provide for hollow fiber filter elements comprising a plurality of porous hollow fiber membranes of a thermoplastic resin, each of which membranes has two end portions, at least one of said end portions of said membranes being directly fusion bonded at its periphery to form a unified terminal block in which the end portions of said membranes are fluid-tightly bonded to each other in a fused fashion. In U.S. Pat. No. 4,980,060, the membranes are fusion bonded through a thermoplastic resin medium to form a unified terminal block structure in which the end portions of said membranes are fluid-tightly bonded together in a fused fashion. It is evident that a key element in these inventions is the fusion of the individual fibers into a single end structure. Even in U.S. Pat. No. 4,980,060, the thermoplastic resin medium is only a minor fraction of the end structure as described in the disclosure. Therefore the strength of the end structure is dependent on the uniformity of the fiber-to-fiber fusion, and is dependent on the physical properties of the fiber material. Moreover, by fusing the hollow fiber membranes together, the structure of individual fibers can be compromised, with possible deleterious effects. The spaces between fibers made of polymers having high viscosity in the melt, such as perfluorinated thermoplastics, would generate bubbles during the fusion. Such bubbles would be very difficult to remove and would be sources of weakness. Therefore, a filter cartridge that had the individual fibers bonded to the end seal material would have a more uniform and stronger structure. Furthermore, these patents do not address the very serious difficulties involve in fabricating an all perfluorinated thermoplastic cartridge, which require operating at temperatures above 250° C. with high viscosity polymers. Indeed, no discussion is provide to enable a practitioner to differentiate between making filter elements from perfluorinated thermoplastics, or other fluoropolymers, which are recognized as being difficult to fabricate, and other thermoplastics, such as polysulfone or polypropylene.

U.S. Pat. No. 5,154,827 discloses a microporous polyfluorocarbon filter cartridge which uses a membrane made up of three or more sheets of aggregated microporous fluorocarbon polymer, said polymer having in the unaggregated state an individual particle diameter of not more than 0.3 micron. This process is primarily directed to the manufacture of PTFE membranes. Reduction of particle size to the range specified greatly increases the difficulty of the manufacturing process. In the present invention described in this application, membranes are made from perfluorinated thermoplastic resins reduced to approximately 100 to 1000 micron size, preferably about 300 micron size, by a suitable grinding process. Moreover, in the present invention, a single membrane sheet can be used.

U.S. Pat. No. 5,158,680 discloses a membrane-type separator having a porous film membrane consisting essentially of a layer of a porous polytetrafluoroethylene resin particle bonded structure substantially devoid of a fibrillated portion. The invention provides a method of producing a porous membrane comprising: forming a film having a hollow construction or a sheet-like construction from a polytetrafluoroethylene resin dispersion and a fiber- or film-forming polymer. The disclosure states that the "membrane" of the invention means the porous membrane obtained from the above film by removing the film-forming polymer. Such membranes required are a more complex manufacturing process and are weaker due to the particle bonded structure than those formed from phase inversion methods as described in this application, and are limited in the polymers that can be used to those that are supplied as aqueous or solvent based dispersions.

In U.S. Pat. No. 5,855,783, a pleated filter cartridge utilizes a poly(tetrafluoroethylene) paper support for poly (tetrafluoroethylene) membranes. Perfluorinated thermoplastic membranes are not contemplated or disclosed.

What is desired is a cartridge formed of a material which has the same or similar properties as PTFE resin but which is easier and less expensive to manufacture and which provides one with the capability of various modifications and complex designs which are not available with PTFE products today. The present invention provides such a device.

SUMMARY OF THE INVENTION

In a first embodiment, the present invention provides for a filter cartridge comprising a housing with a first and a second end, a membrane filter having two surfaces with a porous wall between, with two ends within the housing, sealing means to seal each end of the membrane filter into a shaped form, so that a sealed membrane end is within the housing at or near the first end of the housing and the seal of the other end of the membrane filter is at or near the second end of the housing. Inlet and outlet means are provide to allow a fluid containing a substance to be filtered to enter the housing and contact one surface of the membrane, whereby the fluid will pass through the membrane filter and become separated from a portion of the filtered substance, and the fluid passing through the membrane filter will exit the outlet means.

In a further embodiment, the membrane filter of the first embodiment is a pleated flat sheet membrane.

In a second embodiment, the present invention provides for a filter cartridge comprising a housing with a first and a second end, a membrane filter having two surfaces with a porous wall between, with two ends within the housing, sealing means to seal each end of the membrane filter into a shaped form, so that a sealed membrane end is within the housing at or near the first end of the housing and the seal of the other end of the membrane filter is at or near the second end of the housing. The membrane filter comprises a plurality of hollow fiber membranes having an outer diameter and an inner diameter. The housing has at least one fluid inlet or outlet means. The inner diameters of the fibers are open to fluid flow passing from outside the housing to the inside of the housing across the fiber seal, whereby the fluid will pass through the membrane filter and become separated from a portion of the filtered substance, and the fluid passing through the membrane filter will exit housing through the outlet means of the housing.

In a version of the second embodiment, the fibers at both ends of the cartridge are open to fluid flow.

In a third embodiment, the present invention provides for a filter cartridge comprising a housing with a first and a second end, a membrane filter having two surfaces with a porous wall between, with two ends within the housing, sealing means to seal each end of the membrane filter into a shaped form, so that a sealed membrane end is within the housing at or near the first end of the housing and the seal of the other end of the membrane filter is at or near the second end of the housing. The membrane filter comprises a plurality of hollow fiber membranes having an outer diameter and an inner diameter. The housing has at least one fluid inlet or outlet means. The housing has inlet means for the fluid to be filtered to enter the housing and contact the outer diameter of the hollow fiber membranes. Filtered fluid passing through the membrane walls exits the housing through the inner diameter of the hollow fiber membranes, which are open to fluid flow across either or both of the sealing means.

In version of the third embodiment, the fluid to be filtered enters the housing through inlet means in the sealing means. This could be, but is not limited to, a tube or pipe extending through the sealing means with fluid flow perforations on the length within the housing.

In a fourth embodiment, the filter is formed of a wound depth filter.

In a further embodiment, the filter is a flat sheet formed into a series of disks.

IN THE DRAWINGS

DETAILED DESCRIPTION OF THE INVENTION

This invention provides a perfluorinated thermoplastic resin filter cartridge. The advantages of such a device are many. Perfluorinated thermoplastic resins inherently have a high degree of chemical and temperature resistance and have very low amounts of extractable matter, making their use for ultrapure filtration a desirable advantage. Lastly, as they are thermoplastic, membranes and components can be easily formed and bonded together. In essence, these polymers provide all of the advantages of PTFE resins without their disadvantages.

Filter cartridges are comprised of a membrane filter, a housing in which the filter is located and fluid-tight seals. In the present invention, the potting or sealing material which bonds the membrane in whatever form it may be, and the membrane or membranes are formed of perfluorinated thermoplastic resins. The housing is preferably made of perfluorinated thermoplastic resin, although PTFE may be used. The remainder of the elements are formed of perfluorinated thermoplastic resins.

Figure 1:
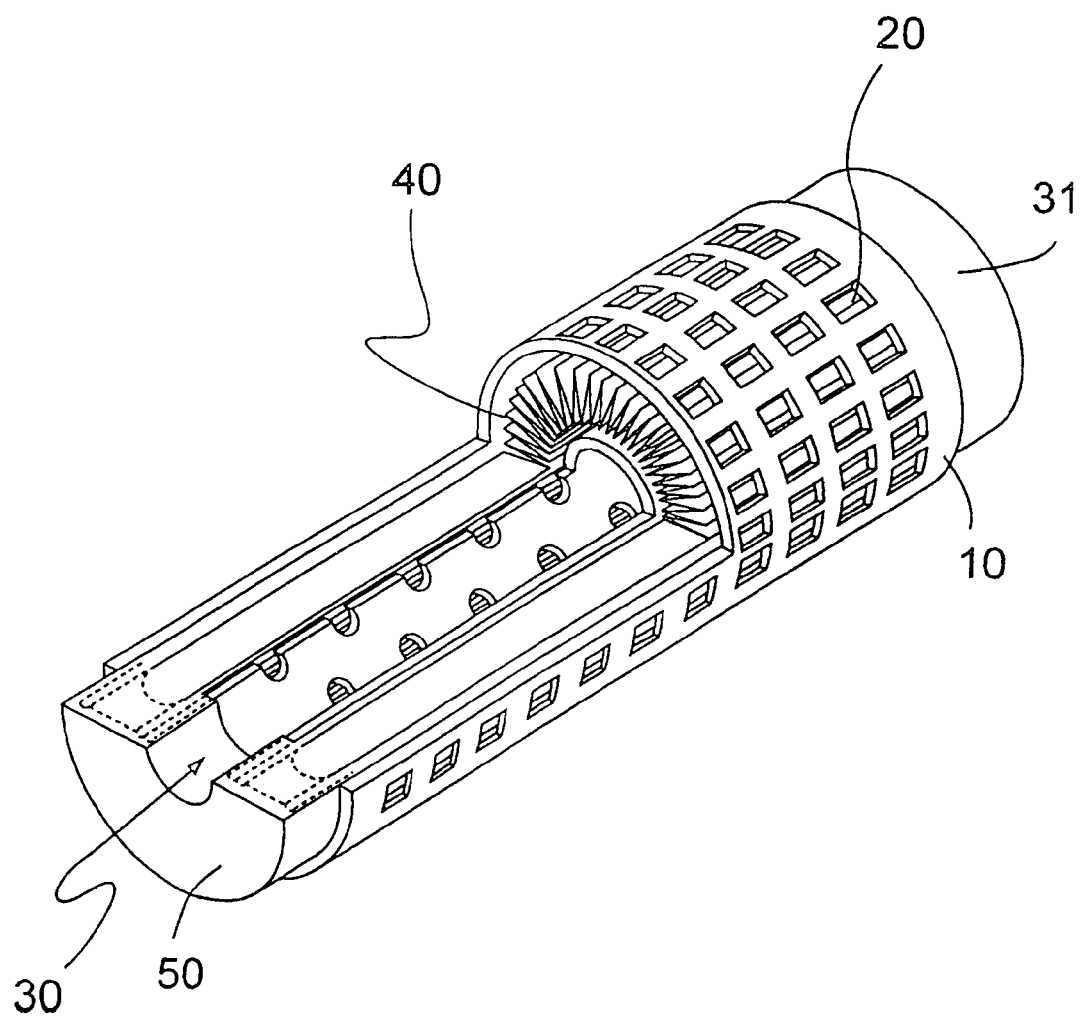
FIG. 1 shows an embodiment of the present invention as a filtration cartridge with a pleated membrane in cross-sectional view.

In FIG. 1 is shown a preferred embodiment of the present invention for a pleated sheet membrane. The perfluorinated thermoplastic filter membrane is made as described in U.S. Pat. Nos. 4,902,456, 4,906,377, 4,990,294, and 5,032,274. In the usual procedure, the membrane is placed between permeable fabric supporters in a sandwich form and folded into pleats. The upstream and downstream supports also provide drainage for the membrane. Suitable supports are non-woven or woven fabrics, formed nets, knitted fabrics, and punched sheets or similar webs. These are preferably made from perfluorinated thermoplastics resins. The pleated membrane sandwich is formed into a cylinder having two ends, with the pleats running axially, and the two axial ends of the pleated sandwich are bonded together by a combination of heat and pressure.

The housing 10, which may be as in this instance a cylindrical tube, although other shapes and configurations may be used, has inlets 20 and an outlet 30 with a membrane 40, in this instance a pleated flat sheet membrane 40, contained within the housing 10 between the inlet 20 and the outlet 30. The cartridge may have outlets on one or both ends. The membrane 40 is sealed in such a manner that all fluid entering the inlets 20 must pass through the membrane 40 before reaching the outlet(s) 30. In this way, one is assured of complete filtration of the fluid.

In this particular embodiment, the pleated filter membrane 40 is sealed or potted in a formed perfluorinated thermoplastic end seal 50. Seal 50 is formed to bond fluid-tightly to the membrane pleat end portions, and has means formed into said end seal to act as outlet 30. The seal can be formed and bonded to the pleated membrane according to the teachings of U.S. Patent Application 60/117,853, filed Jan. 29, 1999, the teachings of which are incorporated by reference. In this method, which overcomes the problems of potting with materials that have high melting temperatures, the housing is bonded to the end seal during the potting process. This method can also be used to pot only the pleated membrane ends, and the housing is then fitted over the potted ends. The opposite end 31 of the cartridge is in this embodiment shown as a closed end although it too could have an outlet 30 if so desired.

A molded core may be used as an internal support for the pleated membrane cylinder, or the pleated cylinder may be used without such a core. The core is made of a perfluorinated thermoplastic and has fluid flow opening, such as the inlets 20, or similar, so that the filtered fluid passing through the filter may reach the outlet.

Figure 2:
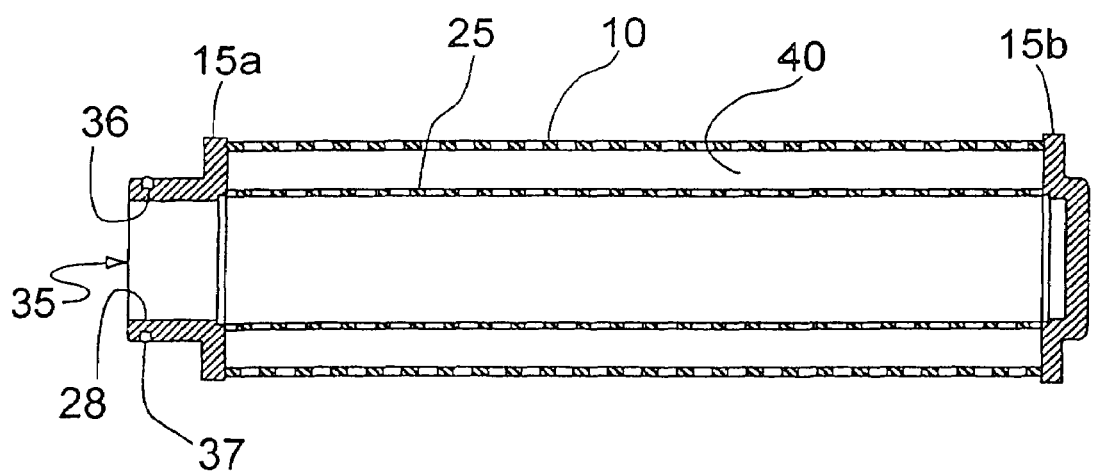
FIG. 2 shows an embodiment of the present invention as a filtration cartridge with a pleated membrane with end caps in cross-sectional view.

In FIG. 2 is shown a version of this embodiment in which the cartridge 10 has end caps (15a and 15b) are used at each end of the housing. In this Figure, end cap 15a has means for fluid outlet 35. Also are shown an O-ring 37 and groove 36 for mating fluid-tightly with fluid recovery system. (Not shown) End cap 15b is impervious to fluid flow, so that all filtered fluid exits by outlet 35. If cartridge filters are desired to be used in series, the end cap in the position of end cap 15b would have fluid flow means to mate with end cap 15a of a serial cartridge, or a fluid flow adapter would be used to join two cartridges. Also shown is an internal support core 25. End caps are used to support the filter cylinder either in conjunction with the potted ends discussed above and shown in FIG. 1, or are used both to seal the pleated membrane sandwich ends and support the cylinder. In either case the end caps are thermally bonded to the housing in a fluid-tight seal around the entire periphery of the housing. If the end caps are used as the pleated membrane sandwich seal, the cap will be heated so as to melt the surface to which the membrane will be potted, while maintaining the opposite surface solid, by cooling if necessary. Once a sufficient depth of molten polymer is formed, one end of the pleated membrane cylinder held within a housing is immersed in the molten polymer and then cooled to form the membrane seal and to bond the housing to the cap. The pleated membrane sandwich may extend a short length pass the end of the housing or may be of equal length as the housing. A similar process is then conducted at the other end of the housing/pleated membrane sandwich cylinder.

The sealing means and the membrane 40 are formed of one or more perfluorinated, thermoplastic resins. Preferably, each of the elements of the device is preferably formed from one or more perfluorinated thermoplastic resins.

The membrane may also be in the form of one or more hollow fibers. Perfluorinated thermoplastic hollow fibers and their method of making are taught in U.S. Patent Applications 60/117,852 and 60/117,854, filed Jan. 29, 1999 and U.S. Pat. Nos. 4,902,456, 4,906,377, 4,990,294, and 5,032,274, all of which are incorporated herein in their entireties.

One such process is based on the Thermally Induced Phase Separation (TIPS) method of making porous structures and membranes. A mixture of polymer pellets, usually ground to a size smaller than supplied by the manufacturer, and a solvent, such as chlorotrifluoroethylene oligomer, is first mixed to a paste or paste-like consistency. The polymer comprises between approximately 12% to 35% by weight of the mixture. The solvent is chosen so the membrane formation occurs by liquid-liquid, rather than solid-liquid phase separation when the solution is extruded and cooled. Preferred solvents are saturated low molecular weight polymers of chlorotrifluoroethylene. A preferred solvent is HaloVac® 60 from Halocarbon Products Corporation, River edge, N.J. Choice of the solvent is dictated by the ability of the solvent to dissolve the polymer when heated to form an upper critical solution temperature solution, but not to excessively boil at that temperature. Fiber extrusion is referred to as spinning and the extruded fiber length from the die exit to the take-up station is referred to as the spin line. The paste is metered into a heated extruder barrel where the temperature raised to above the upper critical solution temperature so that dissolution occurs. The homogeneous solution is then extruded through an annular die directly into a liquid cooling bath with no air gap. The liquid cooling bath is maintained at a temperature below the upper critical solution temperature of the polymer solution. The preferred bath liquid is not a solvent for the thermoplastic polymer, even at the extrusion temperature. Upon cooling, the heated and shaped solution undergoes phase separation and a gel fiber results. The die tip is slightly submerged for vertical spinning, i.e., the spin line falls downward, in the direction of a freely falling body. For horizontal spinning, where the spin line exits directly in the horizontal attitude, and is maintained more or less in that plane until at least the first guide roll, a specially design die is used. The die is firmly positioned against an insulated wall with the die tip penetrating through an opening having a liquid-tight seal in the insulator wall. A trough for cooling liquid flow is placed in a recess in the opposite side of the insulating wall, in a manner that will maintain the die nose outlet in a submerged condition. Cooling liquid flows in the trough and overflows in a region of the trough of lesser depth, keeping the die nose outlet submerged with a flow of cooling liquid. In both the vertical and horizontal methods, a booster heater and temperature control means is used to briefly raise the solution temperature at the die tip to prevent premature cooling. In a subsequent step, the dissolution solvent is removed by extraction and the resultant hollow fiber membrane is dried under restraint to prevent membrane shrinkage and collapse. Optionally the dried fiber may be heat set at 200° C. to 300° C.

The housing and the selection and arrangement of the membrane within the housing is a matter of design and is well known to one of ordinary skill in the art. In the usual case, a bundle of a plurality of hollow fiber membranes having two ends is fluid tightly sealed or potted in at least one end. The potted end or ends is cut perpendicularly to the fiber direction or otherwise trimmed to open the fibers for fluid flow.

Practitioners use several methods to form hollow fiber membrane cartridges. In one case, a bundle of a plurality of hollow fiber membranes would be potted with the fibers oriented more or less parallel to the housing axis and each end of the bundle potted. Either or both potted ends would be cut and opened, depending on the cartridge design and application. In other cases, the fiber bundle is made into a looped arrangement. This can be a simple folded-over single loop, or more complex cross wound type structures that are freestanding. The single loop is usually potted at the non-looped end, although some practitioners will pot the looped end for stability in use. The wound structures can be potted at one or both ends. In some cases, the wound structure is cut in half before potting to form two looped structures, each of which is potted at the cut ends.

A cartridge similar to those shown in FIGS. 1 and 2 could be envisioned by one skilled in the art for what is usually termed "dead end" filtration. The practitioner would substitute a potted fiber bundle for the pleated membrane filter sandwich. These could be used with either the feed stream fluid to be filtered contacting the outside surface of the membranes and the filtered fluid recovered from the lumen of the fibers, or the feed stream could be fed to the lumen of the hollow fiber membranes and the filtered fluid recovered form the outer surface of the fibers.

Figure 3:
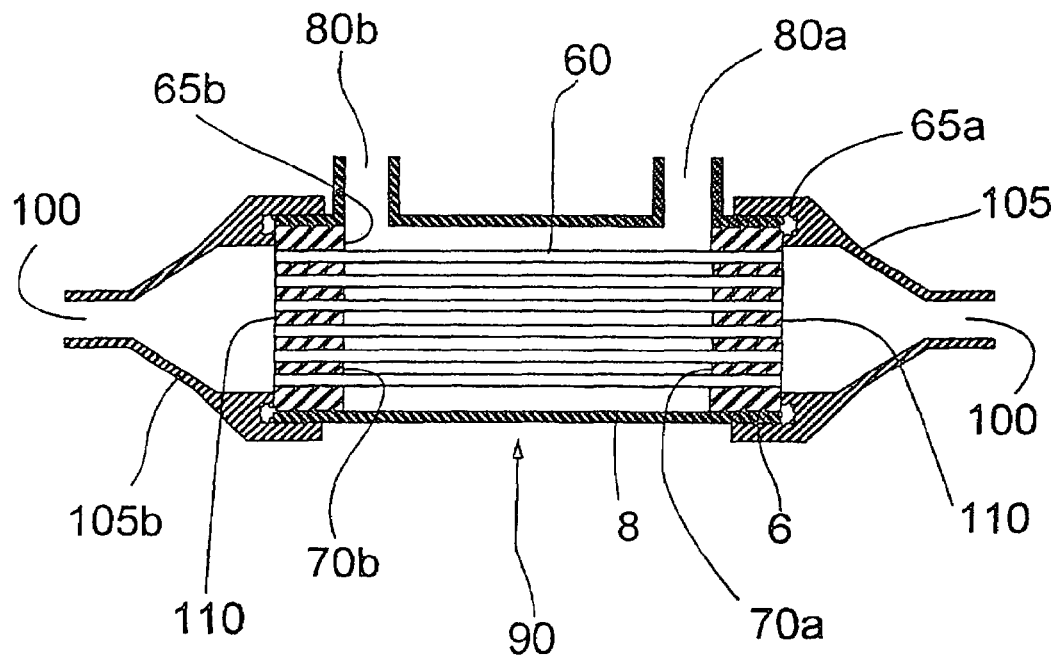
FIG. 3 shows an embodiment of the present invention as a filtration cartridge with hollow fiber membranes in cross-sectional view.

Alternatively, for a hollow fiber device, the outlet or inlet is formed on the shell side of the fibers (outside) and the other outlet or inlet as the case may be is formed to be in communication with the interior or lumen of the hollow fiber bundle. One style of this device is shown in FIG. 3 which shows a plurality of hollow fibers 60 made into a bundle and having both ends 65a and 65b contained within a first and a second pot 70a and 70b. There is shown an inlet 80a mounted on the housing 90. Additionally, there is a filtrate outlet, 100, which connects the lumens or interior of the fibers to the outlet of the device. Optionally, there may be a waste or recirculation outlet 80b formed in the housing for fluid which has not passed through the wall of the fibers and left the cartridge through the filtrate outlet 100.

As is shown in FIG. 3, the ends of the bundle 65a and b are sealed to a first end cap 105a and a second end cap 105b respectively. The blocks 70a and b unify the bundle and in the presently shown embodiment, form the fluid tight seal 110 between the housing 90 and the bundle such that fluid which enters the inlet 80a and desires to pass to the filtrate outlet 100 must do so by passing through the wall of the fiber into its lumen. In another embodiment, not shown, one of the blocks could be sealed such that fluid must always flow through only one end of the bundle of fibers.

Other arrangements for such hollow fiber filtration devices are well known in the art and may be used by one in practicing the present invention.

Figure 4:
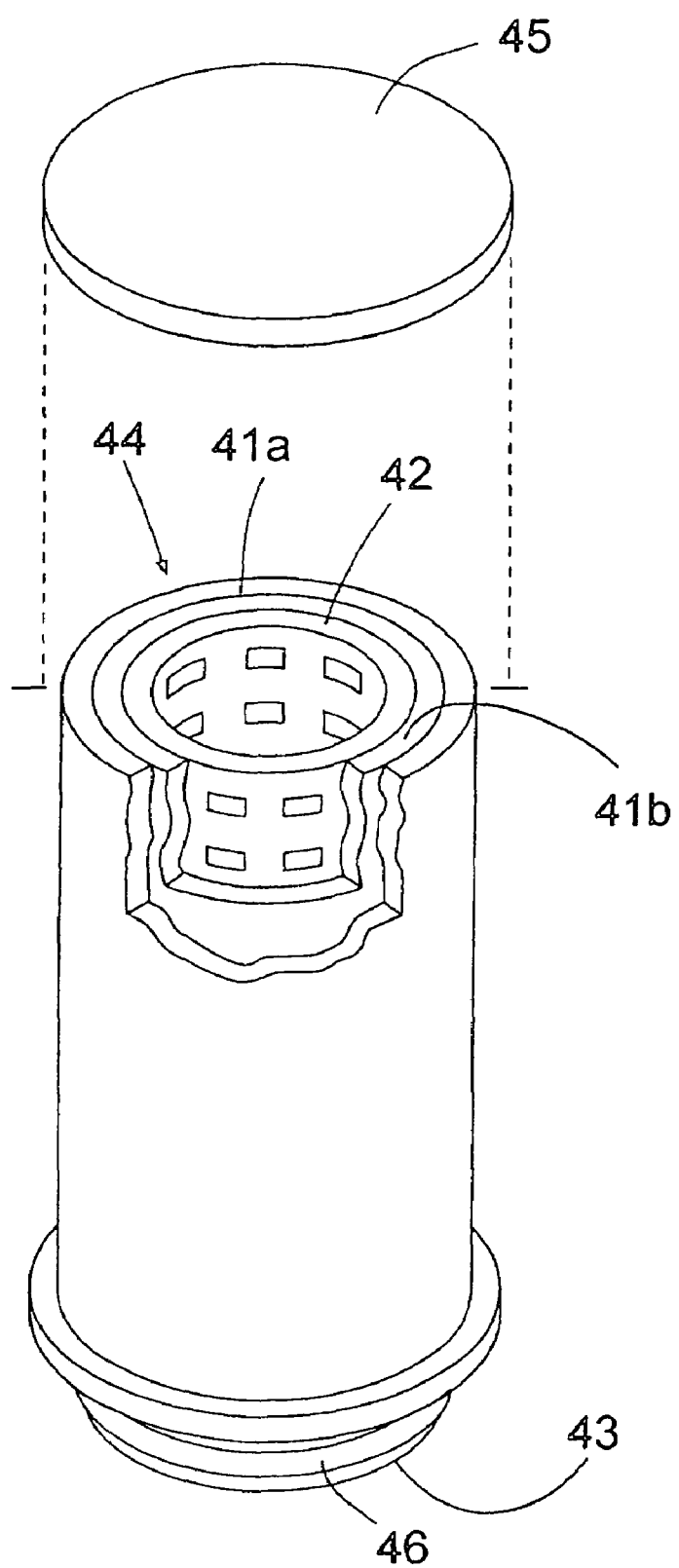
FIG. 4 shows an embodiment of the present invention as a filtration cartridge with a depth filter comprising wound fibers in cross-sectional view.

FIG. 4 shows a depth filter made according to the present invention. In this embodiment the membrane 41 is formed of one or more fibers, made from of one or more perfluorinated thermoplastic resins, that are wound as two distinct layers of different porosity, 41a and 41b around a central core 42. The spaces between the wrappings of the fiber create the pores of the membrane. As is well known within the art, a depth filter may be of one or more fibers, each having a constant diameter. Alternatively, it may be made from one fiber of constant diameter or from a continuous fiber that has a diameter that varies over its length in order to achieve the effect of varying fiber diameter. Preferably, the depth filter may be made with one or more fibers of various diameters so as to vary the pore size through the depth of the filter. Additionally, one may use a series of varying depth filters in order to create a stepped porosity and therefore filtration capability to the depth filter. Moreover, the depth filter may be combined with one or more flat sheet membranes, typically in the form of a pleated filter, on its outer surface, between layers of depth filters or on its inner surface to enhance filtration capability.

Regardless of the selection of fibers and or combinations with other filters, the core 42 of the filter is attached to the outlet 43 in such a manner so as to form a fluid tight seal between the core 42 and the outlet 43. Additionally, the top 44 of the depth filter is sealed by a closed end cap 45 so as to form a liquid tight seal. In this manner, fluid must pass through the membrane 41a and b into the core 42 and then through the outlet 43. The central core 42 may be attached to the outlet by O-rings, mechanical threads or other such mechanical equivalents or by a thermal bonding between the core 42 and the outlet 43. The thermal bonding method is preferred. More preferably, the thermal bonding is achieved by the use of perfluorinated, thermoplastic resins for both the core and the end cab 45B. The bonding may occur through the use of additional resin that seals the two components together or alternatively, they may be directly bonded to each other, using such means as ultrasonic welding, convection heating and other such well-known means in the art. The filter may then be placed in a housing with the outlet 43 being sealed to the housing outlet by any conventional means such as O-rings 46 as shown in the drawing or threaded fixtures, friction fitting or a chemical or thermal bond.

Figure 5:
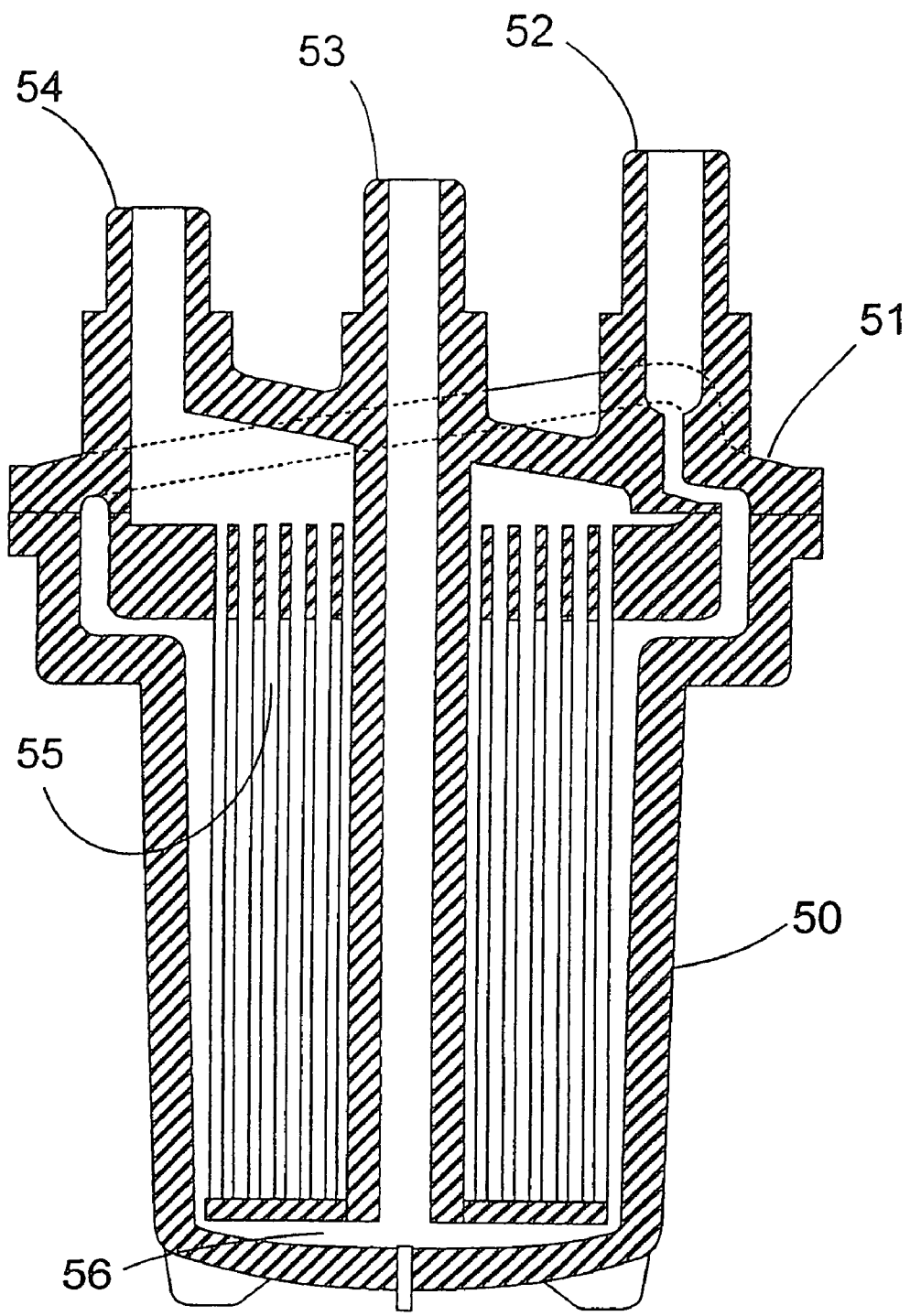
FIG. 5 shows an embodiment of the present invention as a filtration cartridge utilizing a low volume holdup filtration device in cross-sectional view.

FIG. 5 shows another preferred embodiment of the present invention. This embodiment and its method of making is taught in U.S. Pat. No. 5,762,789, the teachings of which are incorporated herein in their entireties. The device is designed for low volume holdup filtration device. It has a housing 50, an end cap 51 with a vent 52, inlet 53 and outlet 54 and a membrane 55, either formed of a flat sheet or as a bundle of hollow fibers (as shown). The inlet 53 is directed from the top of the end cap 51 to the bottom 56 of the housing 50 wherein the fluid traveling through the inlet 53 then passes into the membrane which is sealed in a fluid tight arrangement such that all fluid from the inlet 53 which passes to the outlet 54 must pass through the membrane 55. In an alternative arrangement, the outlet 54 is located such that it is near the bottom of the housing 50 and travels to the top of the end cap 51. The inlet 53 is simply located within the end cap 51 and passes fluid to the membrane where it flows through to the outlet 54.

Regardless of the configuration of the filter, whether it uses a flat sheet, hollow fiber, depth style filter element or disk elements, a key to the invention is the formation of a liquid tight seal between the filter and the cartridge such that an integral filtration device is formed. The problem in the past has been how to accomplish this sealing without harming the membrane and insuring that the material selected for the sealing is identical or similar and compatible to the poly(TFE-co-PFAVE) resin used in making the membrane.

It has been found that various methods may be used in order to properly seal the membrane(s) within the housing and obtain a fluid tight seal. In all of these methods it has been found that one should use one or more perfluorinated thermoplastic resins as the potting or sealing resin, which has a lower peak melting temperature than the membrane. Preferably, it has a peak melting point of at least 5° C. below that of the membrane. More preferably, it has a peak melting point from about 10 to about 50° C. below that of the membrane. Additionally, it is preferred that the resin also has a reasonably low melt viscosity. Through the use of this material, integral sealing of the membrane can be achieved. The use of a resin which has a melting point below that of the membrane allows for longer contact time between the molten resin and the membrane to attain complete sealing of the membrane without damage to the membrane or collapse of its pore structure adjacent the molten plastic.

One such method is taught in a co-pending application 60/117,856, filed Jan. 29, 1999, the teachings of which are incorporated herein in their entireties. In that method, a membrane such as hollow fibers, are arranged into an array, such as a woven mat, a series of fibers attached to a pair of parallel but spaced apart tapes or a series of individual fibers which are held together by the molten resin itself. The array is positioned under a nozzle or pair of nozzles, from which the molten perfluorinated thermoplastic resin is dispensed onto one or more portions of the array, as the array is either wound upon itself or a mandrel. After the array has been assembled, it is then subjected to a post-formation heating step at a temperature and for a time sufficient to cause the resin to melt and flow between the fibers and fill any and all gaps or voids that may have existed.

An alternative method of sealing is taught by co-pending application 60/117,853, filed Jan. 29, 1999, the teachings of which are incorporated herein in their entireties. In this method, a pool of molten perfluorinated thermoplastic resin is created and a membrane which is to be sealed is inserted into a temporary recess formed in the molten pool and maintained in that recess until the recess refills with molten resin thereby sealing the membrane. The membrane can then be removed from the molten pool and allowed to cool. The resin has a melting point below that of the membrane in order to prevent any damage to the membrane.

While the above reference teaches the use of this method with hollow fiber membranes, it may also be used with other membrane configurations, especially flat sheets and wound fiber filters. In the embodiment using flat sheets or wound fiber filters, such as depth filters, one may form the pool in an end cap or other such portion of the housing provided that the cap or housing component selected is a perfluorinated thermoplastic resin compatible to those which form the membrane and the sealing material. Preferably it is also formed of the same perfluorinated thermoplastic resin. Whether formed of the same resin or a compatible resin, it must have a melting point above that of the sealing material so as to allow for the melting of the sealing material within that component.

One such method for sealing the membrane is to select a sealing resin which has a melting point below that of the membrane and the end cap or caps. One may simply insert the membrane into one of the end caps and then flow the molten resin into the cap while maintaining the temperature above the melting point of the sealing resin in order to allow it to flow and completely encompass and seal the membrane within the cap. If desired, the opposite end of the membrane can then be similarly sealed within a separate cap. Alternatively, one may place the resin within the cap and elevate the temperature to a point above the melting point of the resin but below that of the cap. The membrane is then simply inserted into the molten sealing resin and the temperature is maintained for a period of time sufficient to allow for complete sealing of the membrane within the resin within the cap. In this embodiment, the resin may be solid when placed within the cap (e.g., it may be a powder inserted into the cap at room temperature) and then heated to a point above its melting point. Alternatively, the resin may be heated separately until it is molten, the cap is then heated and the molten resin is inserted into the cap. A further alternative is to simply insert the component such as the housing and membrane into the molten pool of sealing material in order to form the desired seal.

Of course with a flat sheet membrane which formed into a generally cylindrical shape, there is also often the need to seal the longitudinal seam between the two adjacent ends of the sheet. This may also be done through the use of a perfluorinated, thermoplastic resin that again has a peak melting point below that of the membrane. Typically, the membrane is either wrapped upon itself or around a core and the two adjacent ends either butt together or overlap each other by a suitable amount. In either case, the resin can be melted and applied along the two edges so as to seal the two edges together. Alternatively, the butted or overlapped axial ends can be thermally bonded by application of suitable heat and pressure.

The formation of a depth filter formed of perfluorinated thermoplastic resin may occur simply by extruding a fiber of molten perfluorinated resin onto a rotating mandrel such that the fibers bond to each other where they cross. Alternatively, the fiber may be pre formed and wound upon a core. The wound core is then heated to a temperature at or above the melting point or glass transition temperature of the fiber so as to cause the fibers to bond to each other where they cross.

EXAMPLE 1

Microporous thermoplastic perfluorinated hollow fiber membranes made from Ausimont's MFA 620 resin according to the teachings of U.S. Pat. Nos. 4,990,294 and 4,902,456 were used for potting in this example. The peak melting temperature of the fibers as measured by differential scanning calorimetry (DSC) was 289° C. The outside diameter of each fiber was 1000 microns and the inside diameter was 600 microns. Porosity was approximately 65%. The potting resin used was a thermoplastic perfluorinated resin available from Ausimont as MFA19405/13 resin. The peak melting temperature of this resin was 258° C. and its melt flow rate (MFI at 5 kg, 372° C. as described by ASTM D 2116) was 124 g/10 minutes.

Approximately 90 strands of the above fibers, each being about 15 cm in length, were arranged in a parallel array and taped together near both ends of the fiber to form a fiber mat. A method similar to that described in U.S. Pat. No. 5,695,702 was used to extrude two molten streams of the potting resin described above in a perpendicular direction onto the mat. The streams were spaced about 9 cm apart and were each about 2.5 cm in width having a thickness of about 0.075 cm. The stream die temperature was set at 335° C. The mat/molten resin streams combination was spirally wound on a poly(tetrafluoroethylene-co-hexafluoropropylene) tube into a cylindrical shaped bundle with a pair of potted ends. It was observed that the molten potting resin also bonded to the FEP tube.

EXAMPLE 2

Potting resin from Ausimont, grade 940AX with a melting point of 256 C and a melt flow index of about 200, was heated and melted at 275 C in a heating cup about 4" wide and 3" deep. After about 24 hr, the resin was completely clear and it had no trapped bubbles. Degassing hollow fibers with 500µ ID and 150µ wall, made from 30% MFA 620 solids conc. and HaloVac 60, were used to prepare the fiber loops on a frame about 12" long. The fiber frames were extracted in Genesolv for about 24 hrs. The frames were retrieved, air dried, and then annealed at 280 C for 24 hrs. The frames were retrieved from the oven, cooled and the fiber loops unwound from the frame. The fiber bundles were put back into the oven and annealed for another 24 hrs. The fiber bundles were retrieved and cooled. A bundle was then assembled with about 2000 fibers and they were inserted into a PFA housing about 10" long, 2" ID and a wall thickness of about ¼". The housing ends were pretreated and fused with MFA 904AX powdered resin. A depression was made with a rod in the potting cup. The housing and the fiber bundle are inserted into the cavity and were left there for 2 days. The potted fiber bundle was retrieved carefully and the housing reversed to treat the other end. After both ends were potted, the potting was cut to expose the lumens. The potted surfaces were then polished with a heat gun to remove any loose resins. The module was tested for integrity with IPA. It was found that one fiber had a defect. A solder gun was used to repair the module to plug both ends of the fiber. The module was tested again and was integral.

After the potted ends were cooled, the bundle was removed and inspected. One could visually observe a number of voids and bubbles in the potting surrounding the fibers. Adhesion strength was excellent. The fibers could not be pulled out of the potting compound. Following inspection, excess fibers and tubing beyond the potted ends were trimmed off to be readied for post-extrusion heat treatment. One of the ends was then placed in a cylindrical cup-shaped metal holder with depth and diameter approximately the same dimensions as the potted end. The holder with the potted end was then fitted into a cutout in a metal heating block. The block was heated with electrical heating bands and its temperature was controlled at 280° C. The sample was heated for about one hour at that temperature. This procedure was repeated for the opposite end of the bundle. After completion of the post-extrusion heat treatment, the ends were machined to until the lumens of the fibers were exposed. The fibers were observed to be bonded together on their shell side by the potting resin and no visible voids were observed. Adhesion strength was the same as before the heating treatment.

EXAMPLE 3

A container with dimensions of 57 millimeters (mm) diameter, 25 mm deep was partially filled with 45 grams of poly(tetrafluoroethylene-co-perfluoro(alkylvinylether)) having a melting temperature of 256° C. and a melt index 373 at 5 Kg, 373° C. The container was placed in an oven at 275° C. for approximately 24 hours to produce a molten pool of the poly (tetrafluoroethylene-co-perfluoro(alkylvinylether)) in the container. A bundle of 30 hollow fiber membrane fibers was made. The fibers were 8 centimeter long, with an outer diameter of 850 microns, and a wall thickness of 225 microns. The fibers were made from poly (tetrafluoroethylene-co-perfluoro(alkylvinylether)) having a melt temperature of approximately 285° C. The fiber bundle was tied near one end with a length of Teflon® pipe tape. The fibers were placed in a hollow cylinder made of poly(tetrafluoroethylene-co-perfluoro(propylvinylether)) (PFA) having an inner diameter of approximately 6.4 millimeters. The fibers were held in place with a thin rod threaded through the fibers under the tie and with the rod resting on the rim of the hollow cylinder. Fiber packing density was approximately 60%. The container with the molten pool of potting material was removed from the oven and a temporary recess approximately 12 mm deep made in the pool with a Teflon® rod 12.75 mm in diameter. The hollow cylinder was place into the temporary recess and support in place with a clamp. The container and the hollow cylinder with the fiber bundle was returned to the 275° C. oven and held there at 275° C. for approximately two days. The container and the hollow cylinder with the fiber bundle were removed from the oven after two days and the hollow cylinder with the encapsulated fibers pulled from the molten potting material and allowed to cool and solidify. A cut was made across the diameter of the hollow cylinder through the pot at a position above the looped ends of the fibers in the bundle. The opposing fiber ends were sealed using method similar to the potting method described above. To prevent the pot from melting, the container with molten pool of potting material was held in a heater block maintained at 275° C. so that only the end being sealed was heated. The opposing end of the hollow cylinder was placed in a temporary recess made in the pool and held in place with a clamp. After approximately 2 hours the hollow cylinder with the fibers was pulled out of the molten potting material and allowed to cool. Excess potting material was removed.

A cross-section of the pot was examined under an optical microscope. It was observed that the potting material filled the interstitial spaces completely. The potting material had penetrated into the surface pores of the membrane and the interface between the fibers and the potting material was clear. The bundle was immersed in isopropyl alcohol and air pressure applied to the opened fiber ends. The filter element had a visual bubble point of about 45 pounds per square inch, indicating an integral element.

EXAMPLE 4

Approximately 175 poly(tetrafluoroethylene-co-perfluoro (alkylvinylether)) fiber loops having a melting point of approximately 285° C. were bundled and prepared for potting in a similar manner to that of example 1. Fiber packing density was approximately 60%. To reduce the possibility of compression of this larger bundle by the flow of potting material, a wire grid was used to divide to fiber bundle into four approximately equal groups. Potting and opposing fiber end sealing was done similar to the method of example 1. Isopropyl alcohol bubble point testing showed the filter element to be integral.

While the present invention has been described in regard to its preferred embodiments, other embodiments, alternatives and modifications of the present invention will be obvious to one of ordinary skill in the art and it is meant in the following claims to include such other embodiments, alternatives and modifications of the present invention.

We claim:

1. A perfluorinated thermoplastic resin filtration cartridge comprising:

a housing having an inlet and an outlet; and
one or more membrane filters located between the inlet and the outlet;
sealing means forming a liquid-tight seal between the one or more membrane filters and the outlet;
such that an integral filtration device is formed, wherein all fluid must pass through the one or more membrane filters from the inlet to the outlet;
wherein the seal and the one or more membrane filters are formed of perfluorinated thermoplastic resins,
said membrane formed by thermally induced phase separation from perfluorinated thermoplastic resins,
said resins being selected from the group consisting of poly(tetrafluoroethylene-co-perfluoro(alkylvinylether)), poly(tetrafluoroethylene-co-hexafluoropropylene)) and blends thereof; and
wherein the sealing means has a melting point equal to or less than that of the membrane filter resins;
wherein the membrane is a depth filter formed of one or more wound fibers.

2. The cartridge of claim 1, wherein the perfluorinated thermoplastic polymer is poly(tetrafluororethylene)-co-perfluoro(alkylvinylether)) and the alkyl is selected from the group consisting of propyl, methyl and blends of propyl and methyl.

3. The filter cartridge of claim 1, wherein the filter cartridge comprises a cylindrical form.

4. The filter cartridge of claim 1, wherein the liquid tight seal prevents fluid entering the housing from mixing with filtered fluid exiting the housing.

5. The filter cartridge of claim 1, wherein the potting material has a lower melting temperature than the melting or softening temperature of the material used to make the membrane.

6. The filter cartridge of claim 5, wherein the melting or softening temperature of the potting material is at least about 5° C. lower than the melting temperature of the material used to make the membrane.

7. The filter cartridge of claim 5, wherein the melting temperature of the seal material is at least about 10° C. lower than the melting or softening temperature of the material used to make the membrane.

8. The filter cartridge of claim 1, further comprising one or more end caps for the housing wherein the end caps are formed of perfluorinated thermoplastic resin.

9. The filter cartridge of claim 8, wherein each end cap is liquid tightly joined to an end of the housing.

10. The filter cartridge of claim 9, wherein the end caps and the housing form a unitary end structure.

11. The filter cartridge of claim 1, wherein the membrane further comprises in combination a microporous membrane.

12. The filter cartridge of claim 1, wherein the membrane further comprises in combination an ultrafiltration membrane.

13. The filter cartridge of claim 1, wherein the perfluorinated thermoplastic resin is poly(TFE-co-PFAVE).

14. The filter cartridge of claim 1, wherein the perfluorinated thermoplastic resin is selected from the group consisting of poly(tetrafluoroethylene-co-perfluoro(alkylvinylether)), poly(tetrafluoroethylene-co-hexafluoropropylene), and blends thereof.

* * * * *